United States Patent Office 2,861,080
Patented Nov. 18, 1958

2,861,080
PROCESS FOR MAKING DIOXOLANES

Peter S. Petrie, Midland, Mich., assignor to The Dow Chemical Company, Midland, Mich., a corporation of Delaware No Drawing. Application July 3, 1957
Serial No. 669,717

5 Claims. (Cl. 260—340.9)

This invention relates to processes for the hydrogenation and cyclization of phenoxyalkanols whereby dioxolanes are produced.

The phenoxyalkanols useful in the invention are those having the formula

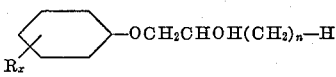

wherein R is an alkyl radical containing 1 to 18 carbon atoms, $x$ is an integer from 0 to 3 and $n$ is an integer from 0 to 2. Thus, they are the phenyl or mono-, di- or trialkylphenyl ethers of ethylene, propylene or butylene glycol.

Catalytic hydrogenation of the above-described phenoxyalkanols results in hydrogenation of the aromatic ring and cyclization of the hydroxyalkyl side-chain whereby dioxolanes are produced which have the formula

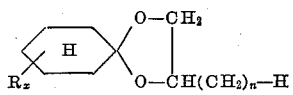

wherein R, $x$ and $n$ have the same significance as above.

The process of the invention is carried out under substantially the conditions normally used for hydrogenation. Thus, the catalyst may suitably be the well known palladized or platinized charcoal or any other form of palladium or platinum having a high surface to volume ratio, Raney nickel, supported nickel, copper chromite or other known hydrogenation catalyst. Whereas ordinary hydrogenations proceed best when the catalyst is freshly prepared, it has been found that in the present process the catalyst improves with reuse, especially when it is platinum or palladium. In fact, it has been found advantageous to modify or slightly poison such fresh catalysts before use. This may be done by treating it with acetic acid, hydrogen peroxide, sodium sulfide or the like. Such modification of the catalyst by reuse or by chemical treatment decreases the formation of alcohols and glycols and increases the formation of dioxolanes.

The temperature and hydrogen pressure suitable for the process of the invention depend somewhat on the activity of the catalyst. In general, it is preferred to operate at the lowest practicable temperature in order to minimize the formation of alcohols and glycols. Highly active platinum and palladium catalysts may be used at temperatures as low as 50° C. while nickel, copper chromite and other less active catalysts may require temperatures of 100° or higher. While the process is operable over the range of at least 50 to 200° C., the preferred range is 100 to 175°. Similarly, the hydrogen pressure required depends somewhat on the activity of the catalyst. With the more active catalysts, satisfactory rates of reaction can be attained at pressures as low as 100 p. s. i. while the less active ones may require several hundred pounds. In general, any pressure above about 100 p. s. i. is practicable, while the preferred range, for practical reasons, is about 200 to 500 p. s. i.

No solvent is required for the reaction and in general it is preferred to operate without them, though they may be used if desired. Any inert liquid that dissolves the ether being hydrogenated may be used, suitable ones being cyclohexane, ethers, alcohols and the like.

The practice of the invention is illustrated by the following examples.

GENERAL PROCEDURE

The ether to be hydrogenated was placed in a high-pressure reactor adapted for agitation by being rocked, the palladized charcoal catalyst (5% Pd on charcoal, 5 to 10 g. per mole of ether) was added, the reactor was flushed with hydrogen, sealed and heated to the desired temperature. Hydrogen was pumped in until the desired pressure was attained, after which the reactor was agitated until absorption of hydrogen became slow. The reactor was then cooled and vented and its contents removed and filtered to recover the catalyst. The filtrate was analyzed by fractional distillation at a pressure of 10–20 mm.

The results of several typical experiments are shown in the following table. All were run at a pressure of 350 to 400 p. s. i. and with 10 g. of catalyst.

Hydrogenation of ethers ROCH$_2$CHOH-(CH$_2$)$_n$-H

| Ex. No. | Ether used | | | Reaction conditions | | Conversion, mole percent | Dioxolane yield, percent |
|---|---|---|---|---|---|---|---|
| | R | n | Moles | Temp., °C. | Time, hr. | | |
| 1 | Phenyl | 1 | 1.65 | 110 | 13 | 35 | 20 |
| 2 | do | 1 | 1.65 | 125 | 28 | 66 | 15 |
| 3 | do | 1 | 1.65 | 155 | 6 | 100 | 8 |
| 4a | do | 1 | 1.65 | 155 | 11 | 95 | 13 |
| 5b | do | 1 | 1.65 | 155 | 26 | 80 | 17 |
| 6c | do | 1 | 1.65 | 155 | 7 | 100 | 51 |
| 7d | do | 1 | 1.65 | 155 | 8 | 100 | 65 |
| 8e | do | 1 | 1.3 | 150 | 5 | 72 | 14 |
| 9e | do | 1 | 1.0 | 150 | 6 | 100 | 10 |
| 10f | do | 1 | 1.0 | 150 | 8 | 100 | 22 |
| 11g | do | 1 | 1.0 | 150 | 4 | 100 | 36 |
| 12h | do | 1 | 1.0 | 150 | 6 | 100 | 30 |
| 13i | do | 1 | 1.0 | 150 | 7 | 71 | 28 |
| 14j | do | 1 | 1.0 | 150 | 3 | 100 | 42 |
| 15k | do | 1 | 1.0 | 150 | 2 | 100 | 52 |
| 16l | do | 1 | 1.0 | 150 | 3 | 100 | 45 |
| 17m | do | 0 | 2.0 | 150 | 8 | 73 | 65 |
| 18n | do | 0 | 2.0 | 150 | 6 | 100 | 38 |
| 19 | o-Sec. butylphenyl | 1 | 1.2 | 150 | 8 | | 75 | a Catalyst reused in second run.
b Catalyst reused in third run.
c Catalyst reused in fourth run after being washed with toluene and aqueous isopropanol before reuse.
d Catalyst reused fifth time after being washed with aqueous isopropanol.
e Washed with toluene.
f Catalyst washed with toluene and aqueous isopropanol.
g Treated with 0.04 g. of Na$_2$S.9H$_2$O (in 300 cc. water).
h Treated with .06 g. of Na$_2$S.9H$_2$O in 300 cc. water.
i Treated with .10 g. of Na$_2$S.9H$_2$O in 300 cc. water.
j Catalyst treated with water.
k Washed with acetic acid.
l Treated with 10 g. of 30% H$_2$O$_2$ in 300 cc. water.
m Catalyst reused sixth time.
n Catalyst washed with aqueous isopropanol.

The product of Examples 1–16 was 2-methyl-1,4-dioxaspiro[4.5]decane, a dioxolane having the formula

That of Examples 17 and 18 was 1,4-dioxaspiro[4.5]-decane and that of Example 19 was 2-methyl-6-sec.-butyl-1,4-dioxaspiro[4.5]decane.

*Example 20.*—In experiments otherwise similar to those shown in the above table, Raney nickel or supported nickel was used instead of palladized charcoal and dioxolanes were produced. In like manner, other conventional hydrogenation catalysts, such as platinum or copper chromite, may be used.

Other ethers that are converted to dioxolanes by the process of the invention include all those having the above formula wherein R is a phenyl or alkyl substituted phenyl radical and $n$ is 0 to 2. Typical examples of these are the 2-hydroxy-ethyl, 2-hydroxy-1-propyl, 1-hydroxy-2-propyl, and 2-hydroxy-1-butyl ethers of phenol, cresols, xylenols, dibutylphenols, tridecylphenols, dioctadecylphenols and the like.

When very active catalysts, such as platinum or palladium are used, improved results are obtained when instead of fresh catalyst, partially deactivated catalyst is used. It may be deactivated by reuse or by treatment with any of a great variety of reagents known to decrease the activity of such catalysts. These include particularly sulfur and halogen compounds, acids, oxidizing agents and the like.

I claim:

1. A process for making a 1,3-dioxolane having the formula

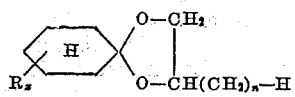

comprising hydrogenating an ether having the formula

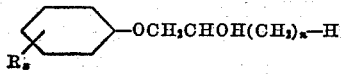

wherein, in each of the above formulas, R is an alkyl radical containing 1 to 18 carbon atoms, $x$ is an integer from 0 to 3 and $n$ is an integer from 0 to 2, said hydrogenation being effected at a temperature of about 50 to 200° C. and a hydrogen pressure of about 100 to 500 p. s. i. and in the presence of a hydrogenation catalyst selected from the group consisting of nickel, platinum, palladium and copper chromite catalysts.

2. A process as defined in claim 1 wherein the temperature is about 110 to 155° C., the hydrogen pressure is about 350 to 400 lb. per sq. in. and the catalyst is palladized charcoal.

3. A process as defined in claim 1 wherein $n$ is one.

4. A process as defined in claim 1 wherein $x$ is one.

5. A process as defined in claim 1 wherein R is a sec.-butyl radical.

References Cited in the file of this patent

Lloyd W. Covert, Ralph Connor, and Homer Adkins: J. Am. Chem. Soc., vol. 54, pages 1651–1663, April 1932.

UNITED STATES PATENT OFFICE
CERTIFICATE OF CORRECTION

Patent No. 2,861,080

November 18, 1958

Peter S. Petrie

It is hereby certified that error appears in the printed specification of the above numbered patent requiring correction and that the said Letters Patent should read as corrected below.

Column 2, line 54, footnote "1" below the table, for "Treated with 10 g. of 30% $H_2O$ in 300 cc. water." read -- Treated with 10 g. of 30% $H_2O_2$ in 300 cc. water. --.

Signed and sealed this 12th day of May 1959.

(SEAL)
Attest:

KARL H. AXLINE
Attesting Officer

ROBERT C. WATSON
Commissioner of Patents